United States Patent
Bellam

(10) Patent No.: US 10,749,965 B2
(45) Date of Patent: Aug. 18, 2020

(54) SYSTEMS AND METHODS FOR CAPTURING AND LOGGING WEB APPLICATION TRAFFIC

(71) Applicant: T-Mobile USA, Inc., Bellevue, WA (US)

(72) Inventor: Prakasa Bellam, Snohomish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 10 days.

(21) Appl. No.: 16/220,812

(22) Filed: Dec. 14, 2018

(65) Prior Publication Data

US 2020/0195729 A1    Jun. 18, 2020

(51) Int. Cl.
*H04L 29/08* (2006.01)
*H04L 29/06* (2006.01)
*H04W 88/02* (2009.01)

(52) U.S. Cl.
CPC ........ *H04L 67/141* (2013.01); *H04L 65/1016* (2013.01); *H04L 67/02* (2013.01); *H04W 88/02* (2013.01)

(58) Field of Classification Search
CPC ... H04L 67/141; H04L 67/02; H04L 65/1016; H04W 88/02
See application file for complete search history.

(56) References Cited

U.S. PATENT DOCUMENTS

| | | | | |
|---|---|---|---|---|
| 2012/0324094 | A1* | 12/2012 | Wyatt | H04W 4/60 709/224 |
| 2015/0281386 | A1* | 10/2015 | Angeles | G06Q 40/12 705/30 |
| 2017/0011079 | A1* | 1/2017 | Verma | H04L 67/2819 |
| 2017/0364949 | A1* | 12/2017 | Vandusen | G06Q 30/0255 |
| 2018/0219881 | A1* | 8/2018 | Kayacik | H04L 63/1416 |

* cited by examiner

*Primary Examiner* — Alina A Boutah
(74) *Attorney, Agent, or Firm* — Lee & Hayes P.C.

(57) ABSTRACT

Systems and methods for capturing, logging, and diagnosing issues associated with web-based applications are disclosed. The systems and methods can include an interceptor application to intercept web-based (e.g., hypertext transfer protocol (HTTP)) requests and responses between web-based applications and third-party application servers. The systems and methods can also include an accumulator application to store request data and response data for a predetermined amount of time or until a predetermined number of requests and responses have been collected. The systems and methods can then send the accumulated data in a list or other data structure to a data logging server for storage in a database. The database can be used to diagnose issues arising on user equipment (UE), including issues caused by web-based applications.

19 Claims, 8 Drawing Sheets

SYSTEMS AND METHODS FOR CAPTURING AND LOGGING WEB APPLICATION TRAFFIC

BACKGROUND

A number of applications are available directly through web browsers and web portals. These applications can be accessed directly from a browser and generally do not need to be downloaded or installed on user equipment ("UE"). These applications can include webmail applications, like Gmail, online auctions sites, like eBay, and myriad other applications. These applications can run or otherwise exchange data using the hypertext transfer protocol (HTTP), WebSockets, and other protocols.

A shortcoming with these applications is that, when there is a problem with a web application, there is currently no way to track the problem via the UE. In other words, because the application is running remotely on an application server and is accessed via a web browser, the process essentially bypasses the UE. Thus, any error checking or logging applications on the UE do not "see" the transactions associated with the web application. Because of this bypass, when the UE malfunctions (e.g., freezes, reboots, etc.), receives an error code from a server or network entity, or experiences other issues caused by the web application, it is often difficult or impossible to identify the cause.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
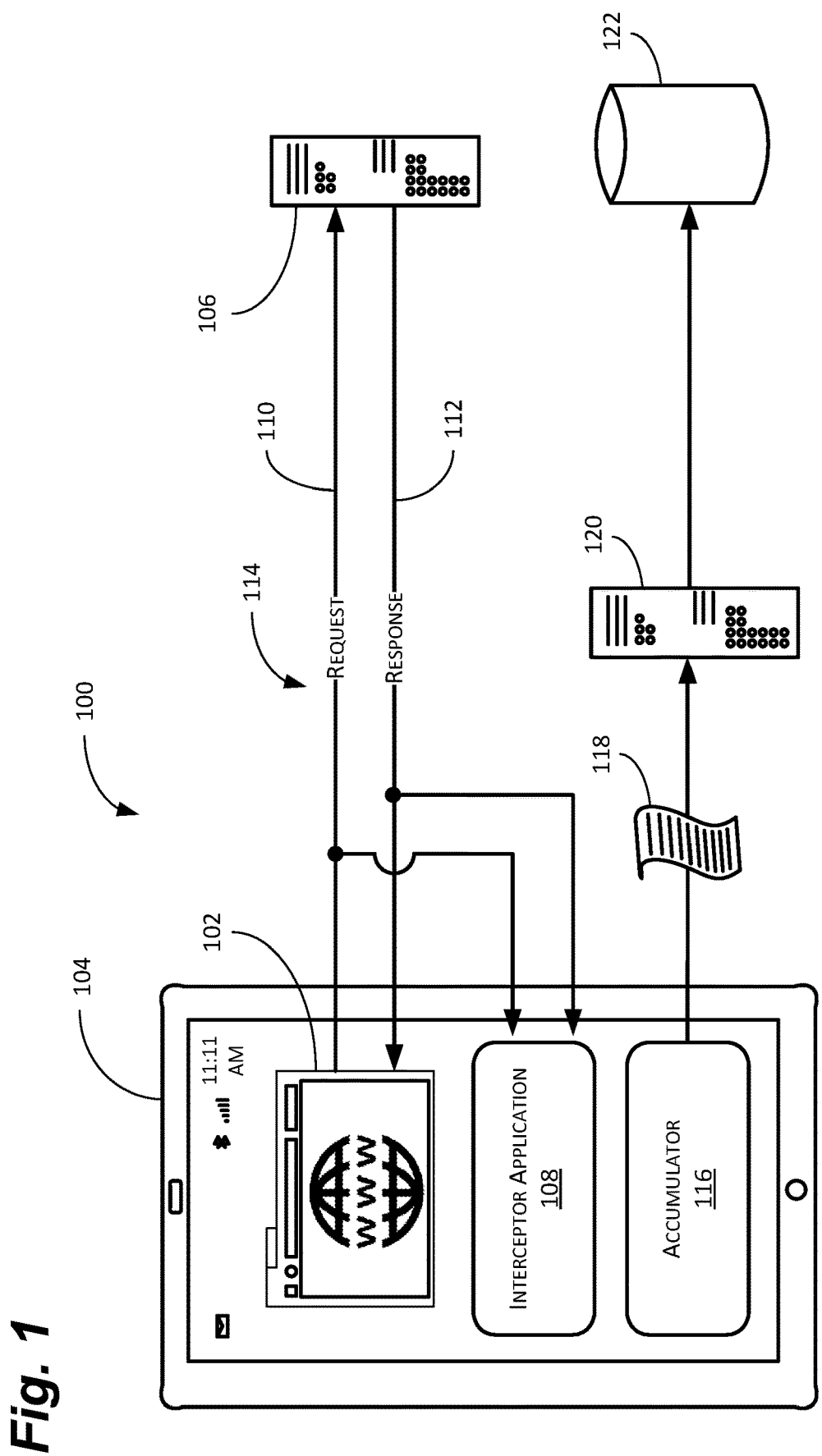
FIG. 1 depicts an example of a system for intercepting hypertext transfer protocol (HTTP) messages from a web application, in accordance with some examples of the present disclosure.

Examples of the present disclosure can comprise systems and methods for intercepting, storing, and logging data related to web applications. The system can intercept requests, responses, errors, and other data (collectively, "signaling transactions") exchanged between a web browser running on a user equipment (UE), for example, and a third-party application server associated with a web application. The system then can store in the memory of the UE a list including a predetermined number of signaling transactions. When the number of signaling transactions stored on the UE reaches a predetermined number, the system can package the list into a list package and send the list package from the UE to a log server.

The log server can receive and store a plurality of lists from a plurality of UEs in a server log for analysis. In some examples, the log server can also include applications to enable the log server to sort and analyze the list to determine whether some errors have a common cause. The log server may generate error reports when the data indicates that a particular web application, third-party application server, UE, or other component is a likely source of an issue—e.g., it appears in a series of error responses within the web application.

Examples of the present disclosure are discussed below with respect to a system including an interceptor application for intercepting hypertext transfer protocol (HTTP) and WebSocket transactions between web applications (e.g., where at least a portion of the application is run or stored on a third-party application server) that are accessed in the browser of the UE such as, for example, online games, e-mail, messaging applications, etc. One of skill in the art will recognize, however, that the system is not so limited. Indeed, the system can be used with other protocols (e.g., message session relay protocol messages) and with other types of applications. Indeed, the interceptor application can be used any time at least a portion of the signaling used on the UE is conducted inside another application or remotely to the UE.

As mentioned above, these signaling transactions generally pass between the UE and the third-party application server inside the web browser. As a result, the signaling transactions are generally not visible to, for example, network providers and operating system (OS) developers. To this end, the log of signaling transactions can enable developers to identify common issues between the UEs and the web application that would not otherwise be available.

A web application can interact with a number of sites through HTTP or WebSockets using a series of requests and responses. The requests can be internal to the server where the application is hosted such as, for example, any of the web sites on the Internet or other application programming interface (API) based applications, among other things. The application owner can log the requests coming to their own server for debugging or transactional tracking purposes, for example, and often these logs are archived for few days or even months based on the business need.

Unfortunately, normal logging implemented by an application developer can only track requests coming to their application. Requests going out from the browser to other web sites, for example, or out to other applications cannot be tracked. As a result, it can be difficult to know what issues are encountered while using the application within a browser—i.e., there are often no logs to enable debugging the issues the user experiences with other requests to outside servers or APIs.

In addition, a similar issue exists when an application is communicating with a third-party server using WebSockets. In this case, the interaction is directly between the application running in a browser to the third-party server. Thus, without some additional features, the application owner cannot track issues without information from the third-party server, which is not always possible. The owner of the third-party server may be unwilling or unable to provide the necessary information, for example.

To address both issues, examples of the present disclosure can include an interceptor application that captures HTTP and/or web socket requests and responses. The interceptor application can send the captured data to an accumulator application. The accumulator application, in turn, can batch the data to a predetermined number of transactions and then send this data to a log server associated with the application (or the application owner) for logging asynchronously. This solves both of the problems listed above and enables the application owner to debug and/or check for any issues faced by application users using the data (either archived or in real time). The aforementioned asynchronous logging can also reduce or eliminate any impact on application users, as the lists can be sent when the web application is not in use or when a network that the UE is connected to is not congested and/or is within a subscription plan (e.g., using Wi-Fi), for example.

To this end, as shown in FIG. 1, examples of the present disclosure can comprise a system 100 for intercepting signaling transactions between web applications 102 running on UE 104 and third-party application servers 106. The system 100 can include an interceptor application 108 to intercept requests 110 and responses 112 (collectively, signaling transactions 114) between the web application 102 and the third-party application server 106—whether via HTTP, WebSockets, or other protocol. The system 100 can also store these signaling transactions 114 in an accumulator application 116.

When a predetermined number of signaling transactions 114 have been saved, the accumulator application 116 can send a batch, or list 118, of signaling transactions 114 to a log server 120. The log server 120, in turn, can include a database, or server log 122, including signaling transactions from multiple UEs 104 and/or multiple applications that include the interceptor application 108 to enable the signaling transactions 114 to be analyzed and debugged. A simplified example of a list 118 is included below:

Application 1|www.server1.com|17:52:52|request|GET|email
Application 1|www.server1.com|17:52:55|response|200 OK|email
. . . .
Application 5|www.server5.com|22:11:03|request|POST-|name1=1
Application 5|www.server5.com|22:11:04|response|404—NOT FOUND|name1
Application 5|www.server5.com|23:23:10|response|WebSocket|Text Message It should be noted that, for security and privacy reasons, the data collected by the applications 108, 116 does not include confidential or personal data. So, for example, the contents of the messages, the user name, and other types of information specific to the user are not included. Indeed, in some examples, the data may be further anonymized and/or encrypted to prevent any disclosures of a confidential or personal nature.

In some examples, the applications 108, 116 can be stored and run directly on the UE 104. In other examples, the applications 108, 116 can run on a remote server in communication with the UE 104. In either case, the signaling transactions 114 can pass through the interceptor application 108 and be sent to the accumulator application 116 to be added to the list 118.

Figure 2:
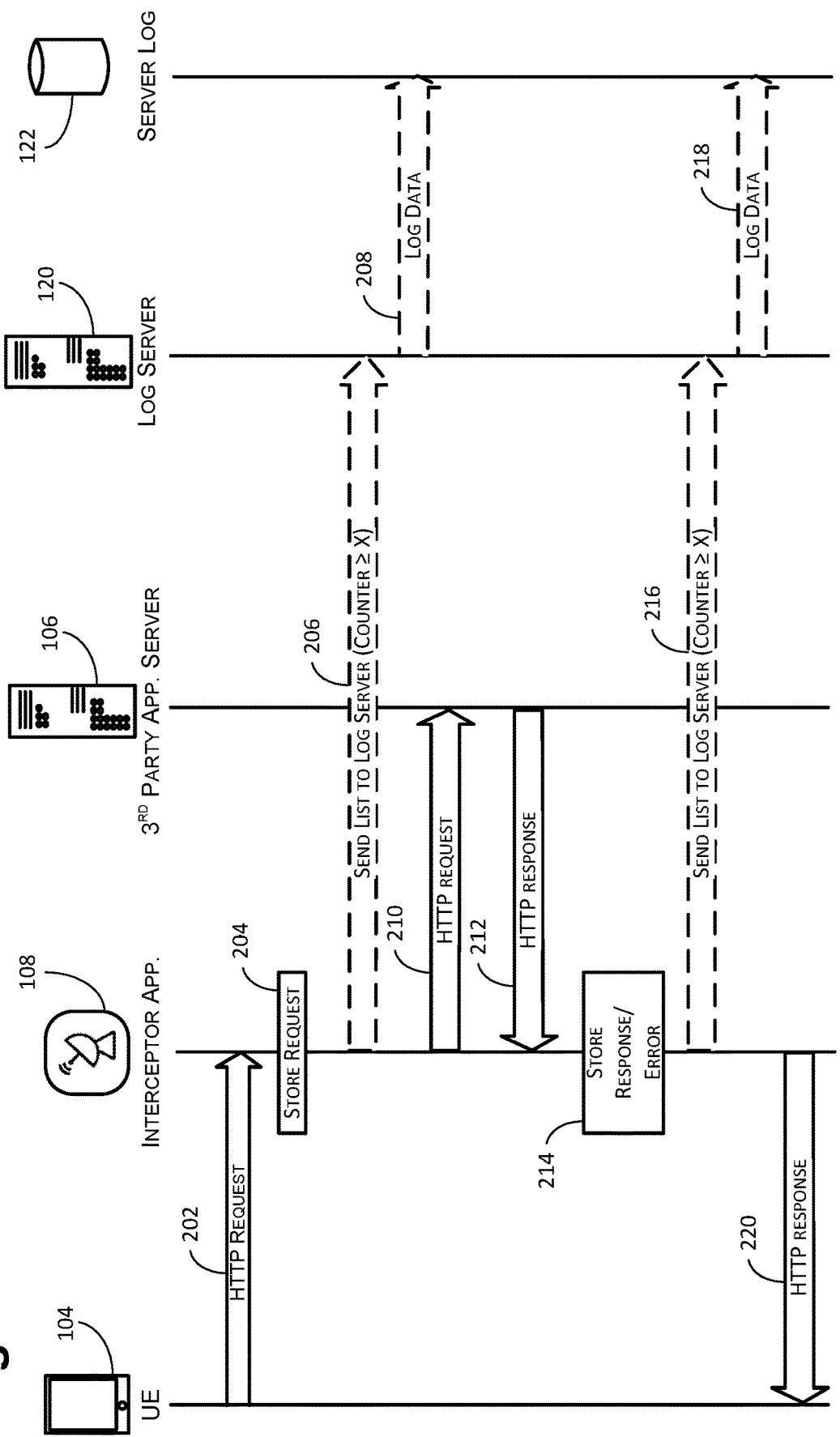
FIG. 2 is an example signal flow for the system of FIG. 1, in accordance with some examples of the present disclosure.

FIG. 2 is an example signal flow diagram for an HTTP transaction between the UE 104 and the third-party application server 106. Of course, while disclosed with respect to an HTTP transaction, other protocols could be used and are contemplated herein. As shown, all signaling transactions 114 pass through the interceptor application 108 and then to the accumulator application 116 for logging. The accumulator application 116 can then periodically send lists 118 of signaling transactions 114 to the log server 120. The log server 120 can periodically, or in real-time, store the signaling transactions 114 in a server log 122. The server log 122 can be used to identify issues with UE 104, web applications 102, third-party application servers 106, and/or other components.

At 202, the UE 104 can send an HTTP request 110. Instead of sending the request 110 directly to the third-party application server 106 (as would normally happen), however, the request 110 is first sent to the interceptor application 108. At 204, the interceptor application 108 sends the request 110 to the accumulator application 116 for addition to the list 118.

At 206, if the number of signaling transactions 114 is equal to the predetermined number of transactions for a list 118 (e.g., 10, 20, 30, etc.), then the accumulator application 116 can send the list 118 to the log server 120. The batch size can be determined based on system and network needs. So, the batch size can be chosen such that the number of lists 118 is relatively small, to reduce the signaling overhead caused by sending the lists 118 themselves, but not so large that transferring the list 118 is difficult or to delay resolution of any detected issues with any equipment. In some examples, the batch size can be based on the maximum transmission unit (MTU) for the network to enable the list 118 to be sent in a single frame. In some examples, the list 118 can also be sent in a manner such that sending the list 118 does not count against the user's data plan. So, for example, the list 118 can be sent with a particular code, using a particular type of request 110, or in a particular type of package that is recognized by the network and is not charged to the user's account.

At 208, the log server 120 can store the batch in the server log 122. The server log 122 can comprise a hard drive on the log server 120, for example, or can include cloud storage or some other data storage facility. The server log 122 can accumulate data from one or more web applications 102 running on multiple UEs 104 to enable issues encountered by these applications to be identified and analyzed. This enables issues that otherwise would not be identifiable from the web applications such as, for example, issues caused by the third-party application server 106 to be identified and addressed.

At 210, at essentially the same time, the HTTP request can be relayed to the third-party application server 106 unmodified. Thus, the operation of the web application 102 and the third-party application server 106 are substantially unaffected. The interceptor application 108 in this respect is merely a pass-through, sending the signaling transactions 114 to the accumulator application 116 and to the third-party application server 106 unmodified. Indeed, the user likely would be unaware of the interceptor application 108, though the interceptor application 108 may nonetheless be disclosed to the user for customer service and/or privacy reasons.

At 212, the response 112 from the third-party application server 106 can be sent back to the UE 104. In this case, however, rather than going directly to the web application 102, the response 112 is first sent to the interceptor application 108. At 214, the interceptor application 108 can send the response 112 to the accumulator application 116 to store the response 112. As before, the interceptor application 108 has no effect on, and is undetectable to, both the third-party application server 106 and the user.

In some examples, at 214, rather than simply storing the response 112, the interceptor application 108 and/or the accumulator application 116 can also differentiate between successful responses 112a and errors 112b. There will inevitably be times when the web application 102 makes a request 110 that cannot be completed. In these instances, it may be particularly useful to analyze these errors 112b because they are associated with an issue. Thus, separating the responses 112 into successful responses 112a and errors 112b can enable developers to spot issues and solve problems more efficiently. Indeed, in some examples, the errors 112b may be further classified by the source of the error 112b (e.g., network issues, server error, application freezes, error codes, etc.) when the source of the error 112b can be determined from the error code. So, 400-series error codes (generically, "4XX codes") such as a "400—Bad Request" may be classified as an error 112b caused by the web application 102 or the UE 104, for example, because this is an error 112b based on the syntax of the request 110 itself. 500-series error codes (generically, "5XX codes") such as "500—Internal Server Error," on the other hand, may be classified as an error 112b associated with the third-party application server 106.

At 216, as before, if the number of signaling transactions 114 is equal to the predetermined number of transactions for a list 118, then the accumulator application 116 can send the batch to the log server 120. At 218, in some examples, the log server 120 can store the list 118 in the server log 122.

At 220, the response 112 can be relayed to the web application 102. And, while there may be several steps in between receiving the response 112, at 204, and relaying the response 112 to the web application, at 220, in reality the process would likely take fractions of seconds. Thus, from the user's standpoint, the interceptor application 108, accumulator application 116, and log server 120 operate in the background without affecting the user experience.

Figure 3:
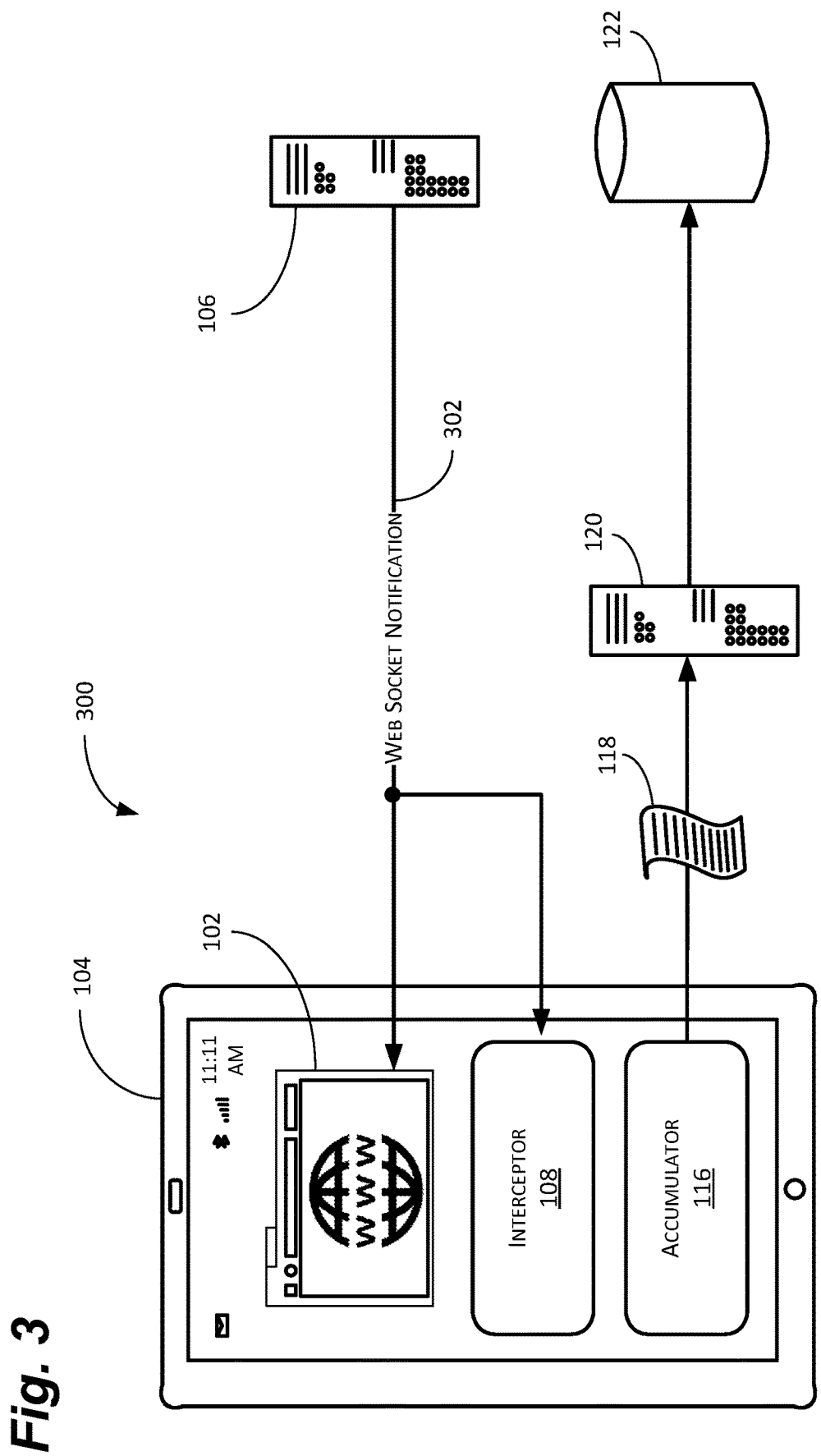
FIG. 3 depicts an example of a system for intercepting WebSocket messages from a web application, in accordance with some examples of the present disclosure.

As shown in FIG. 3, examples of the present disclosure can also comprise a similar system 300 for use with WebSockets. In many cases, WebSockets provide duplex communication between the UE 104 and the third-party application server 106. But, one particular function of WebSockets is to enable the third-party application server 106 to send content to the UE 104 without the UE 104 requesting the information. Thus, unlike HTTP "exchanges" where there is generally a request 110 and a response 112, WebSockets can also be used to send "push" notifications—or content that has not been directly requested by the UE 104 (or the web application 102). This can enable the web application 102 to receive text messages or e-mails as soon as they are sent, for example, rather than waiting for the user to select a "check mail" button.

For WebSockets, therefore, the interceptor application 108 can be configured to detect WebSocket notifications 302 in addition to HTTP requests 110 and responses 112. To this end, the interceptor application 108 can be configured to recognize WebSocket notifications 302, which are in a different format than HTTP messages. When received, the interceptor application 108 can send a copy of the WebSocket notification 302 to the accumulator application 116 and then relay the WebSocket notification 302 to the web application 102. As before, the interception and storage of the WebSocket notification 302 has no effect on the web application 102 and is undetectable to the user.

Figure 4:
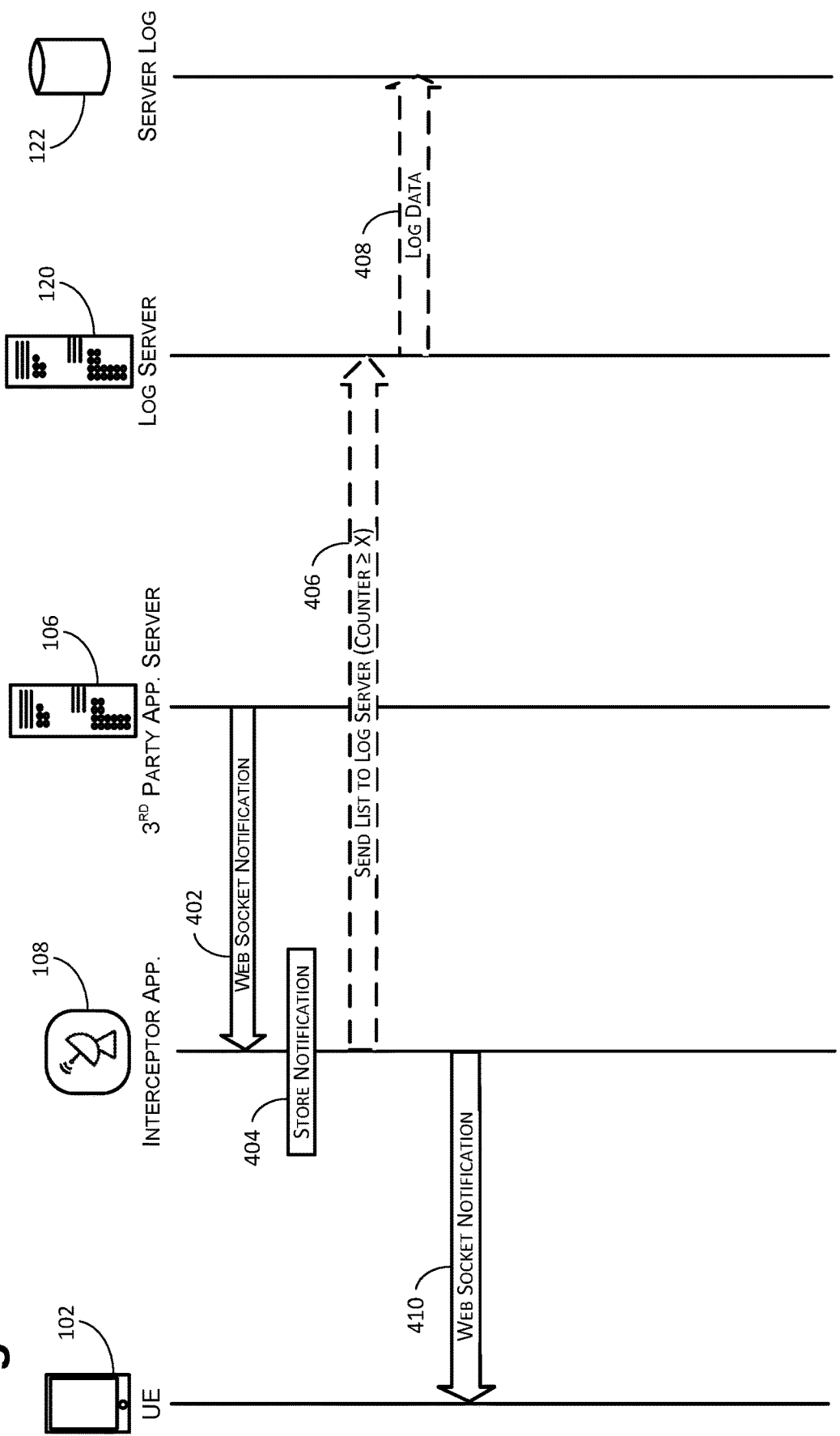
FIG. 4 is an example signal flow for the system of FIG. 3, in accordance with some examples of the present disclosure.

FIG. 4 is a diagram of an example of a call flow for the system 300 when an incoming WebSocket notification 302 is received. The diagram is similar to, though somewhat simpler than, the diagram shown in FIG. 2, at least partially because a WebSocket notification 302 is a "one-way" transaction.

At 402, the third-party application server 106 can send a WebSocket notification 302 to the web application 102. The WebSocket notification 302 can comprise an e-mail, for example, a text message, group chat, stock ticker, social media feed, or other similar data to which the UE 104 is subscribed. And, because the user UE 104 is subscribed to the service ahead of time, the WebSocket notification 302 can be sent to the UE 104 without the UE 104 first requesting the data. This is commonly used to "push" new e-mails or text messages to the UE 104 as soon as they arrive at the server, for example.

At 404, the interceptor application 108 can intercept the WebSocket notification 302 and send a duplicate of the notification to the accumulator application 116. As before, the accumulator application can save a predetermined number of WebSocket notifications 302 and/or requests 110 and responses 112 prior to sending them to the log server 120 for storage and analysis.

At 406, optionally, if the WebSocket notification 302 causes the list 118 to reach the predetermined number of WebSocket notifications 302 and/or requests 110 and responses 112, the accumulator application 116 can send the batch to the log server 120. At 408, if the log server 120 receives a list 118, in some examples, the log server 120 can then store the list 118 in the server log 122. As mentioned above, the server log 122 can be internal or external to the log server 120.

Regardless, at 410, the interceptor application 108 can relay the WebSocket notification 302 to the web application 102. In some examples, the interceptor application 108 can relay the original WebSocket notification 302 to the web application 102 and a copy of the WebSocket notification 302 to the accumulator application 116, or vice-versa. In other examples, the interceptor application 108 can send a copy of the WebSocket notification 302 to the accumulator application 116 and the web application 102. As mentioned above, the interceptor application 108 can have little, or no, perceptible effect on the performance of the web application 102. Indeed, in this case, since the WebSocket notification 302 is a push notification, any delay (generally less than a second) caused by the interceptor application 108 would likely go completely unnoticed. This is especially true for a WebSocket notification 302, since the user does not know exactly when the WebSocket notification 302 is coming—i.e., it is not sent in response to something the user did.

Figure 5:
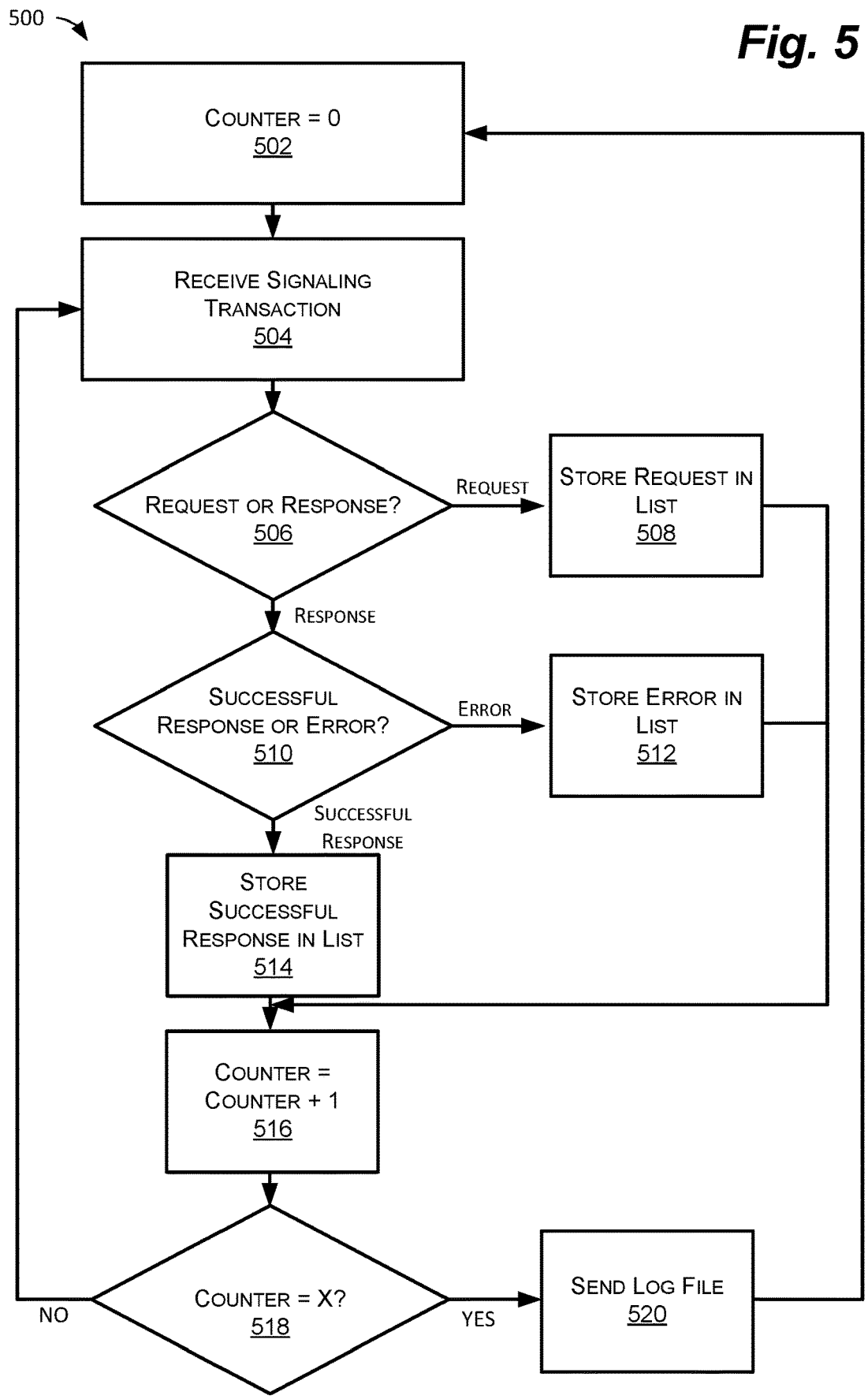
FIG. 5 is a flowchart depicting an example of a method for storing and logging requests, responses, and errors associated with a web application, in accordance with some examples of the present disclosure.

As shown in FIG. 5, examples of the present disclosure can also comprise a method 500 for intercepting, accumulating, and offloading requests 110 and responses 112, including WebSocket notifications 302, among other things. In some examples, the method 500 can also classify each type of signaling transaction 114 into the appropriate tranche (e.g., requests 110 and responses 112; or, requests 110, successful responses 112a, and errors 112b) to aide analysis.

At 502, a counter can be (re)set to zero. In some examples, the counter can be used to determine when the list 118 includes the predetermined number of signaling transactions 114. In other examples, the method 500 can be used to track errors 112b only. In this configuration, the counter may be used to track online errors 112*b* or to create a sublist of errors 112*b*. In either case, once the counter reaches the predetermined number, the list 118 of signaling transactions 114 can be sent to the log server 120. So, for example, the counter could be set to 20, with each list 118 comprising 20 signaling transactions 114. As mentioned above, the counter can be set to any appropriate number such that the signaling between the UE 104 and the log server 120 is kept to a minimum, yet the data package containing the list 118 of signaling transactions 114 is small enough to avoid being cumbersome or to unnecessarily delay the resolution of issues and errors. In some examples, the predetermined number can be set to ensure the list 118 is small enough to be below the network MTU, for example, or can be based on some other network metric.

At 504, the interceptor application 108 can receive a first signaling transaction 114. As mentioned above, for HTTP communications, the first signaling transaction 114 can comprise an outgoing request 110, which can be a request 110 to connect to a server and/or retrieve data, such as a GET or a POST. The first signaling transaction 114 can also comprise an incoming signaling transaction 114, such as the aforementioned WebSocket notification 302. In this instance, the WebSocket notification 302 may be pushed to the UE 104, for example, without the UE 104 making a request.

At 506, the method 500 can determine if the signaling transaction 114 is a request 110 (outgoing) or a response 112 (incoming). As mentioned above, a request 110 can be an HTTP request from the UE 104 to a server to connect to a website, for example, download data, or perform some other action. A response 112 can be a response from a server such as a 200 OK, an error code (e.g., 404—NOT FOUND), or a WebSocket notification 302, among other things.

If the first signaling transaction 114 is determined to be a request 110, then at 508, the accumulator application 116 can store the request in the list 118. In some examples, the list 118 can also include a tag or keyword identifying the first signaling transaction as a request 110—as opposed to a response 112. Indeed, in some examples, the UE 104 may maintain separate lists 118 for requests 110, successful responses 112*a*, errors 112*b*, WebSocket notifications 302, etc. In other examples, all signaling transactions 114 can simply be placed in the list 118, and the list 118 can be sorted at a later time (e.g., by the log server 120).

If the first signaling transaction 114 is determined to be a response 112, on the other hand, then at 510, the method 500 can further determine whether the response 112 is a successful response 112*a* (e.g., a 200 OK) or an error 112*b* (e.g., 405—METHOD NOT ALLOWED). Both successful responses 112*a* and errors 112*b* can be useful diagnostic tools. If a request 110 to a first server is always successful, for example, while a request 110 to a second server is often not successful, this tends to indicate that the server—as opposed to the request 110, the UE 104, or the web application 102—is the source of the issue.

Similarly, the error codes themselves often identify the source of the issue. 4XX error codes, for example, may be generally client related errors, such as, but not limited to, a client not finding a resource on a web server. These tend to indicate a problem with the UE 104, the web application 102, or the request 110 itself. If the UE 104 (or rather, the web application 102) makes a request 110 and the response 112 is a 400—BAD REQUEST, then this may point to a problem with the web application 102 (e.g., providing an improperly formatted request). If the error code is a 5XX code, this generally indicates a problem with a server involved in the request.

If the response is determined to be an error 112*b*, then at 512, the error 112*b* can be stored in the list 118. In some examples, the error 112*b* can also be identified in some way (e.g., with a code, tag, or key word) as an error 112*b*. As mentioned above, in some examples, each type of signaling transaction 114 can be stored in a separate list 118. In other examples, all signaling transactions 114 can be stored in the same list 118, with all sorting and analysis handled by another entity (e.g., the log server 120).

If, on the other hand, the response 112 is determined to be a successful response 112*a*—e.g., 200—OK, 202—ACCEPTED, etc.—then at 514, the method 500 can store the successful response 112*a* in the list 118. As before, all signaling transactions 114 can be lumped into a single list 118 or each type of signaling transaction 114 can be added to its own list 118 or sublist. The list(s) 118 can comprise data that can be easily created, sent, and read such as, for example, Javascript Object Notation (JSON) objects, Binary JSON (BSON), MessagePack, YAML Ain't Markup Language (YAML), and the like.

At 516, regardless of the classification of the signaling transaction 114, the counter can be incremented by 1. In this example, the counter can be incremented from 0 to 1, indicating that there is one signaling transaction 114 in the list 118. In some examples, the method 500 can also track a sublist for each type of transaction. So, for example, separate counters could be used for each sublist of successful response 112*a*, error 112*b*, or other type of signaling transaction 114. In this configuration, the list 118 can be sent to the log server 120 when the counter reaches the predetermined number and/or each sublist can be sent to the log server 120 when it reaches the predetermined number, or a different predetermined number. This may be desirable when a sublist includes errors 112*b* only, for example, to expedite resolving issues. At 518, the method 500 can determined whether the counter is equal to the predetermined number ("X"). As discussed above, the predetermined number can be chosen based on a number of factors, including network parameters, UE capabilities, etc.

If the counter is equal to X (e.g., 10, 20, 30, etc.), then at 520, the accumulator application 116 can send the list 118 to the log server 120. In some examples, the list 118 can be sent to the log server 120 using a representational state transfer (RESTful) API, or similar. The list(s) 118 can comprise, for example, a pipe delimited list with a pipe between each field in the list 118 and with each line representing a new entry. Of course, other formats and delimiters could be used.

If, on the other hand, the counter is not equal to X, as in the current example where it is equal to 1, then the method 500 can return to step 504 to receive the next signaling transaction 114. The method 500 can continue iteratively until the number of entries in the list 118 stored in the accumulator application 116 is equal to X, and at 520, the list 118 can be sent to the log server 120. Each time the list 118 is sent to the log server 120, then at step 502, the counter can be set back to zero to restart the method 500.

Of course, in some examples, a separate counter could track each sublist separately or additionally. In other words, the counter could send the list 118 when it reaches the predetermined number and/or when any one of the subsist reaches the same, or a different, predetermined number. So, for example, the method 500 could send the list 118 reaches 20 entries, or when the a sublist of errors 112*b* reaches 10.

Figure 6:
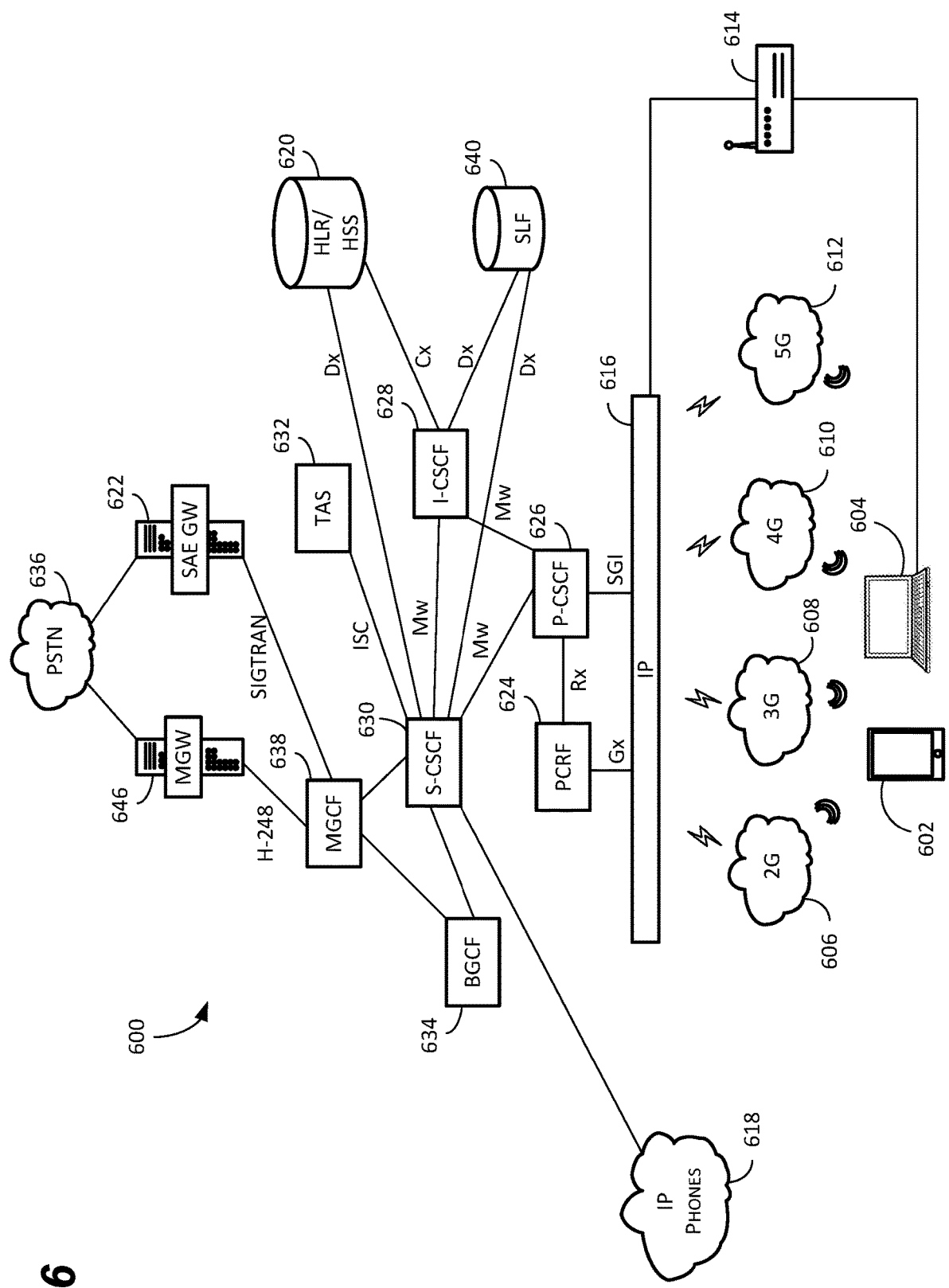
FIG. 6 is an example of an internet multimedia subsystem (IMS) for use with the systems and methods discussed herein, in accordance with some examples of the present disclosure.

FIG. 6 includes the internet protocol multimedia subsystem (IMS) 600 for the 4G LTE 610 and 5G 612 networks for use with the systems 100, 300, and method 500 discussed herein. As shown, the IMS 600 includes several network components for routing signals, storing subscriber information, and connecting across various subsystems and network types. The IMS 600 is built on session initiation protocol (SIP) as the base to further support packaging of voice, video, data, fixed, and mobile services on a single platform to end users. It enables communications across multiple types of networks, including cellular, satellite, broadband, cable, and fixed networks, and enables the creation of efficient interoperating networks. The IMS 600 can also provide communication between UE 602, 604 (e.g., UE 104) and other devices.

The IMS 600 also provides interoperability for UEs 602, 604 and other devices across multiple platforms including, for example, 2G 606, 3G 608, 4G 610, 5G 612, Wi-Fi 614, and internet protocol (IP) 616 networks. The IMS 600 also includes a variety of network entities for providing different services, including the capturing, analysis, and storage of signaling transactions 114, discussed herein. In some examples, the IMS 600 can include, for example, a home location register/home subscriber service (HLR/HSS) 620, service architecture evolution gateway (SAE GW) 622, and a policy and charging rules function (PCRF) 624.

The HLR/HSS 620 is a central database that contains user-related and subscription-related information. The functions of the HLR/HSS 620 include functionalities such as mobility management, call and session establishment support, user authentication and access authorization. The HSS, which is used for LTE connections, is based on the previous HLR and authentication center (AuC) from code division multiple access (CDMA) and global system for mobile communications (GSM) technologies, with each serving substantially the same functions for their respective networks.

To this end, the HLR/HSS 620 can also serve to provide routing instructions (e.g., IP addresses or phone numbers for the various requests 110), and provide any billing associated with requests 110 and responses 112 (e.g., downloads, data use, online games, etc.). So, for example, the UE 602, 604 can send requests to the proxy call session control function (P-CSCF) 626, discussed below, which can then provide information to the HLR/HSS 620 with the necessary credentials to enable the UEs 602, 604 to access web applications 102, for example, via the IMS 600. Once authenticated, the HLR/HSS 620 can then ensure the user is authorized to use the services included in the requests 110, for example, or send an authorization request to a third-generation partnership project authentication, authorization, and accounting (3GPP AAA) server, among other things.

The SAE GW 622 routes and forwards user data packets, while also acting as the mobility anchor for the user plane during inter-eNodeB handovers and as the anchor for mobility between 4G LTE 610, 5G 612, and other 3GPP technologies including, for example, terminating the S4 interface and relaying traffic between 2G 606/3G 608 systems and the packet data network gateway (PGW). For idle state UEs 602, 604, the SAE GW 622 terminates the downlink data path and triggers paging when downlink data arrives for the UEs 602, 604. The SAE GW 622 also manages and stores UE 602, 604 contexts such as, for example, parameters of the IP bearer service and network internal routing information.

The PCRF 624 is a software node that determines policy rules in the overall cellular network, and the IMS 600 specifically. The PCRF 624 generally operates at the network core and accesses subscriber databases (e.g., the HLR/HSS 620) and other specialized functions, such as content handling, such as whether the user has sufficient data left in their plan to receive a video call, in a centralized manner. The PCRF 624 is the main part of the IMS 600 that aggregates information between the IMS 600 and other sources. The PCRF 624 can support the creation of rules and then can automatically make policy decisions for each subscriber active on the IMS 600. The PCRF 624 can also be integrated with different platforms like rating, charging, and subscriber databases or can be deployed as a standalone entity.

The IMS 600 also includes the P-CSCF 626. The P-CSCF 626 is the entry point to the IMS 600 and serves as the outbound proxy server for the UEs 602, 604. The UEs 602, 604 attach to the P-CSCF 626 prior to performing IMS registrations and initiating SIP sessions. The P-CSCF 626 may be in the home domain of the IMS operator, or it may be in the visiting domain, where one or more of the UEs 602, 604 are currently roaming. For attachment to a given P-CSCF 626, the UEs 602, 604 perform P-CSCF 626 discovery procedures. Attachment to the P-CSCF 626 enables the UEs 602, 604 to initiate registrations and sessions with the IMS 600.

The IMS 600 also includes an interrogating-call session control function (I-CSCF) 628. The I-CSCF 628 acts as an inbound SIP proxy server in the IMS 600. During IMS registrations, the I-CSCF 628 queries the HLR/HSS 620 to select the appropriate serving-call session control function (S-CSCF 630), discussed below, which can serve the UEs 602, 604. During IMS sessions, the I-CSCF 628 acts as the entry point to terminating session requests. The I-CSCF 628 routes the incoming session requests to the S-CSCF 630 of the called party.

The S-CSCF 630 acts as a registrar server, and in some cases, as a redirect server. The S-CSCF 630 facilitates the routing path for mobile-originated or mobile-terminated session requests. The S-CSCF 630 also interacts with various components for playing tones and announcements, among other things. For the systems 100, 300, discussed above, the S-CSCF 630 can receive requests 110 from the UEs 602, 604, for example, and establish the appropriate sessions with the third-party application server 106, telephony applications servers (TASs) 632, and other entities according to the services requested by the UEs 602, 604 in the requests 110.

The IMS 600 also includes a breakout gateway control function (BGCF) 634. The BGCF 634 is the IMS 600 element that selects the network in which public switched telephone network (PSTN) 636 (discussed below) breakout is to occur. If the breakout is to occur in the same network as the BGCF 634, for example, then the BGCF 634 selects a media gateway control function (MGCF) 638 (also discussed below) that will be responsible for interworking with the PSTN 636. The MGCF 638 then receives the SIP signaling from the BGCF 634.

The IMS 600 also includes a subscriber location function (SLF) 640. The SLF 640 provides information about the HLR/HSS 620 that is associated with a particular user profile. It is generally implemented using a database. If the IMS 600 contains more than one HLR/HSS 620, then the I-CSCF 628 and S-CSCF 630 will communicate with SLF 640 to locate the appropriate HLR/HSS 620 based on the user profile.

The IMS 600 also includes the aforementioned TAS(s) 632. As the name implies, the TAS 632, sometimes known in a telephony context merely as an application server (AS), is a component used to provide telephony applications and additional multimedia functions. The TAS 632 can include any entity in a telephone network that carries out functions that are not directly related to the routing of messages through the network, such as third-party application servers 106 and the log server 120, among other things. Such functions can also include, for example, in-network answering machines, automatic call forwarding, conference bridges and other types of applications. And, while shown as a single entity in FIG. 6, multiple TASs 632 are generally used with each TAS 632 providing one or more separate services. Based on the services requested by the UE 602, 604 to the S-CSCF 630, for example, the S-CSCF 630 can establish sessions with one or more TASs 632, generally with one TAS 632 for each service.

The IMS 600 also includes the MGCF 638. The MGCF 638 is a SIP endpoint that handles call control protocol conversion between SIP and ISDN user part (ISUP)/bearer-independent call control (BICC) and interfaces with the SAE GW 622 over stream control transmission protocol (SCTP). The MGCF 638 also controls the resources in a media gateway (MGW) 646 across an H.248 interface. The MGW 646 is a translation device or service that converts media streams between disparate telecommunications technologies such as POTS, SS7, next generation networks (2G 606, 3G 608, 4G LTE 610, and 5G 612) or private branch exchange (PBX) systems.

Finally, the IMS 600 also includes the PSTN 636. The PSTN 636 is the world's collection of interconnected voice-oriented public telephone networks, both commercial and government-owned. In some cases, the PSTN 636 can also be referred to as the plain old telephone service (POTS). With respect to IP phones 618, for example, the PSTN 636 furnishes much of the Internet's long-distance infrastructure. Because internet service providers (ISPs) pay long-distance providers for access to their infrastructure and share the circuits among many users through packet-switching (discussed above), internet users avoid having to pay usage tolls to anyone other than their ISPs.

Figure 7:
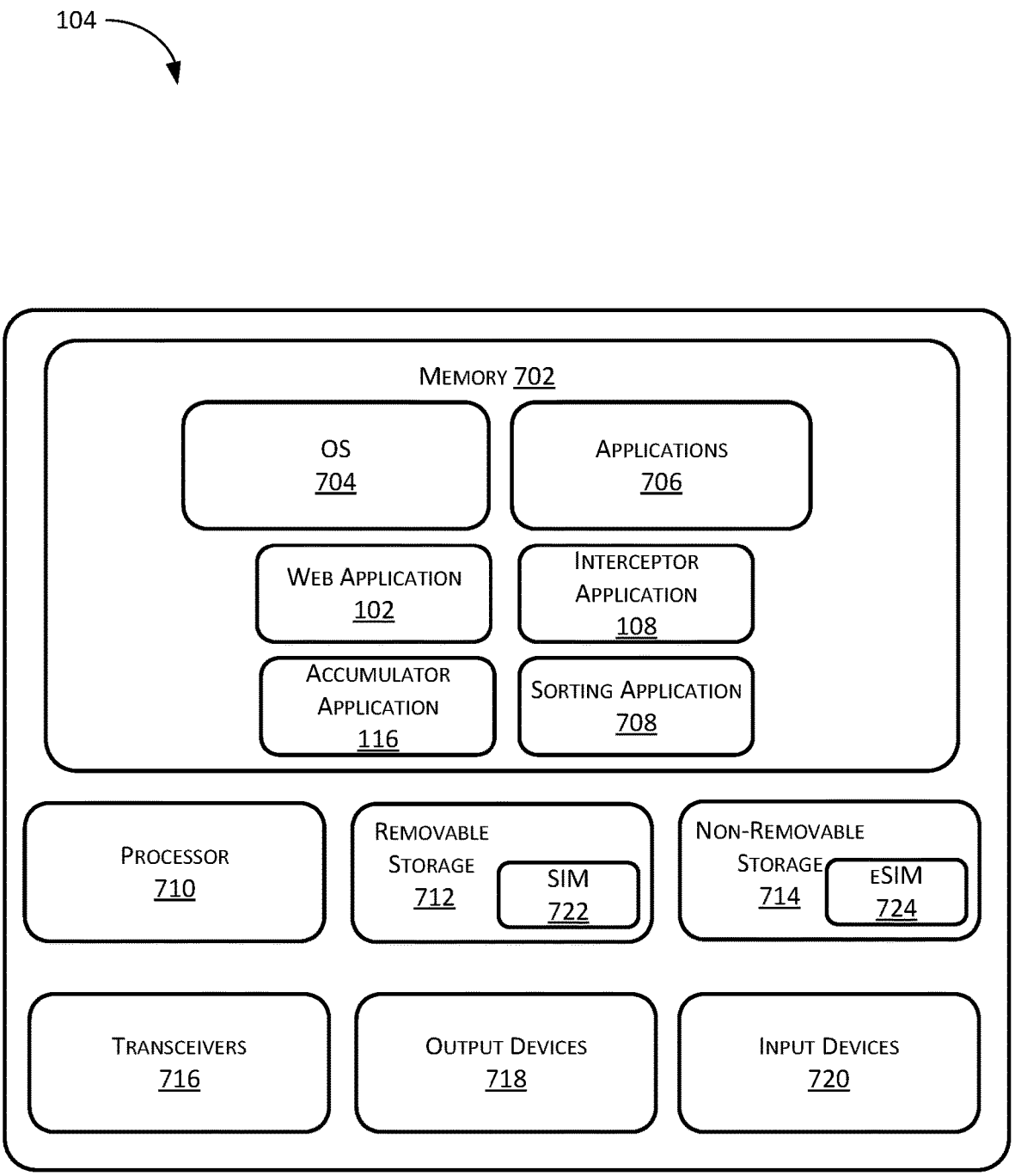
FIG. 7 is an example of a user equipment (UE) for use with the systems and methods disclosed herein, in accordance with some examples of the present disclosure.

FIG. 7 depicts a component level view of the UE 104 for use with the systems 100, 300 and method 500 described herein. The UE 104 could be any UE capable of using HTTP and WebSockets on the IMS 600 and/or IP networks 616. For clarity, the UE 104 is described herein generally as a cell phone, smart phone, or laptop computer. One of skill in the art will recognize, however, that the systems 100, 300 and method 500 described herein can also be used with a variety of other electronic devices, such as, for example, tablet computers, desktops, and other network (e.g., cellular or IP network) connected devices. Indeed, the UE 104 can be any device that can access web applications 102 via the Internet via one or more third-party application servers 106.

The UE 104 can comprise several components to execute the above-mentioned functions. As discussed below, the UE 104 can each comprise memory 702 including an OS 704 and one or more standard applications 706. The standard applications 706 can include many features common to UE such as, for example, contacts, calendars, call logs, voicemail, etc. In this case, the UE 104 can also comprise the interceptor application 108 and the accumulator application 116, among other things. In some examples, the UE 104 can also include a sorting application 708 to sort the various requests 110 and responses 112, as discussed above with reference to FIG. 5.

The UE 104 can also comprise one or more processors 710 and one or more of removable storage 712, non-removable storage 714, transceiver(s) 716, output device(s) 718, and input device(s) 720. In some examples, such as for cellular communication devices, the UE 104 can also include a SIM 722 and/or an eSIM 724, which can include a mobile country code (MCC), mobile network code (MNC), international mobile subscriber identity (IMSI), and other relevant information. In some examples, one or more of the functions (e.g., standard applications 706 and/or the sorting application 708) can be stored on the SIM 722 or the eSIM 724 in addition to, or instead of, being stored in the memory 702.

In various implementations, the memory 702 can be volatile (such as random access memory (RAM)), non-volatile (such as read only memory (ROM), flash memory, etc.), or some combination of the two. The memory 702 can include all, or part, of the functions 102, 108, 116, 706, 708 and the OS 704 for the UE 104, among other things. In some examples, rather than being stored in the memory 702, some, or all, of the functions 102, 108, 116, 706, 708, as well as other information (e.g., call history, contacts, etc.) can be stored on a remote server or cloud of servers accessible by the UE 104 such as a TAS 632.

The memory 702 can also include the OS 704. Of course, the OS 704 varies depending on the manufacturer of the UE 104 and currently comprises, for example, iOS 11.4.1 for Apple products and Pie for Android products. The OS 704 contains the modules and software that support a UE's basic functions, such as scheduling tasks, executing applications, and controlling peripherals. In some examples, the OS 704 can receive signals from the interceptor application 108, for example, to enable the interceptor application 108 to receive signaling transactions 114 from the web browser and/or the transceiver(s) 716. The OS 704 can also enable the UE 104 to send and retrieve data to and from the log server 120 and other components via a cellular data connection or internet connection and perform other functions.

The UE 104 can also include one or more web applications 102. As mentioned above, web applications 102 can include a multitude of applications from e-mail to online gaming where some, or all, of the processing and/or memory for the application is performed by a remote server. As discussed above, these web applications 102 can be accessed via a web browser, for example, and generally at least partially bypass the UE 104, making tracking difficult. Further, in some examples, the bandwidth required to use some web applications 102 can be significant. Capturing and logging signaling transactions 114 may already use UE 104 resources. Therefore, in some examples, asynchronously logging can be used. Asynchronous logging is a process whereby lists can be sent when a web application 102 is not being used, when the UE 104 is on a network that has enough bandwidth, or the UE 104 is communicatively connected to a high bandwidth communication system, such as Wi-Fi. Using asynchronous logging can help reduce or eliminate the impact of the logging on the performance of the UE 104. Further, the EU 104 may determine that the impact on the UE 104 is too significant, or any other reason, and determine that the logging should not occur.

To this end, the UE 104 can also include the interceptor application 108. As the name implies, the interceptor application 108 can intercept signaling transactions 114 coming from the web application 102 and/or the third-party application server 106 to enable logging and analysis of the signaling transactions 114. Thus, a request 110 from a web application 102, for example, can first be sent from the web application 102 to the interceptor application 108. The interceptor application 108 can then send the request 110 to the accumulator application 116 for inclusion in the list 118. The interceptor application 108 can then relay the request 110 to the transceiver(s) 716 and cause the transceiver(s) 716 to send the request 110 to the third-party application server 106. It should be understood, however, that presently disclosed subject matter is not limited to the order described above, as other orders of relaying requests may be followed. For example, some or all of the data may be grouped together and sorted using timestamps on the data.

For inbound signaling transactions 114, or responses 112, the transceiver(s) 716 can receive the response 112 (e.g., a successful response 112a or an error 112b) from the third-party application server 106. The transceiver(s) 716 can then send the response 112 to the interceptor application 108. The interceptor application 108 can then send the response 112 to the accumulator application 116 for inclusion in the list 118. The interceptor application 108 can then relay the response 112 to the web application 102 for execution.

The UE 104 can also include the accumulator application 116. The accumulator application 116 can receive the signaling transactions 114 from the interceptor application 108 and create the list 118 of signaling transactions 114. As mentioned above, the accumulator application 116 can include a counter that maintains a count of how many signaling transactions 114 are stored in the list 118. When the list 118 reaches the predetermined number of entries, the accumulator application 116 can then create a list package including the contents of the list 118. As mentioned above, in some examples, the list package can comprise a JSON object including a pipe delimited list 118 of signaling transactions 114 and associated data. Of course, the list package could also comprise a compressed file (e.g., a .zip file or a PDF), or some other package to facilitate sending the list 118 to the log server 120. The accumulator application 116 can then send a signal to the transceiver(s) 716 to cause the transceiver(s) 716 to send the list package to the log server 120.

In some examples, the accumulator application 116 can store a copy of the list 118 locally in the memory 702 until the list 118 is sent to the log server 120. In some examples, once the list 118 is sent to the log server 120, the list 118 can be erased from memory 702 to reduce the resources consumed by the applications 108, 116. In other examples, the accumulator application 116 can retain a copy of the list 118 in the memory 702 for a predetermined amount of time, or until receiving a command from another entity (e.g., the log server 120) to erase the list 118. In some examples, upon successful receipt of the list 118, the log server 120 can send a signal to the accumulator application 116 to erase the list 118.

In some examples, the UE 104 can also include a sorting application 708. The sorting application 708 can sort the signaling transactions 114 into requests 110 and responses 112. The sorting application 708 may also sort the responses 112 into successful responses 112a (e.g., 200 OK) and errors 112b (e.g., 406—NOT ACCEPTABLE). In some examples, the sorting application 708 can further sort the errors 112b by error code (e.g., 400 BAD REQUEST, 404 NOT FOUND, etc.). The sorting application 708 may also add this information as a data field in the list 118 to facilitate analysis. In other examples, as mentioned below, the sorting application 708 may be located on the log server 120 instead of the UE 104 to reduce resource consumption on the UE 104.

The UE 104 can also comprise one or more processors 710. In some implementations, the processor(s) 710 can be a central processing unit (CPU), a graphics processing unit (GPU), both CPU and GPU, or any other processing unit. The UE 104 may also include additional data storage devices (removable and/or non-removable) such as, for example, magnetic disks, optical disks, or tape. Such additional storage is illustrated in FIG. 7 by removable storage 712 and non-removable storage 714. The removable storage 712 and non-removable storage 714 can store some, or all, of the functions 102, 108, 116, 706, 708 and/or the OS 704.

Non-transitory computer-readable media may include volatile and nonvolatile, removable and non-removable tangible, physical media implemented in technology for storage of information, such as computer readable instructions, data structures, program modules, or other data. The memory 702, removable storage 712, and non-removable storage 714 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the UE 104. Any such non-transitory computer-readable media may be part of the UE 104 or may be a separate database, databank, remote server, or cloud-based server.

In some implementations, the transceiver(s) 716 include any transceivers known in the art. In some examples, the transceiver(s) 716 can include wireless modem(s) to facilitate wireless connectivity with other components (e.g., the third-party application server 106), the Internet, and/or an intranet via the cellular and IP networks. Further, the transceiver(s) 716 may include a radio transceiver that performs the function of transmitting and receiving radio frequency communications via an antenna (e.g., Wi-Fi 614 or Bluetooth®). In other examples, the transceiver(s) 716 may include wired communication components, such as a wired modem or Ethernet port, for communicating via one or more wired networks. The transceiver(s) 716 can enable the UE 104 to send requests 110, receive responses 112, send the list 118, and provide other communications associated with the systems 100, 300 and method 500, described above.

In some implementations, the output device(s) 718 include any output devices known in the art, such as a display (e.g., a liquid crystal or thin-film transistor (TFT) display), a touchscreen, speakers, a vibrating mechanism, or a tactile feedback mechanism. In some examples, the output device(s) 718 can play various sounds when sending or receiving signaling transactions 114. In some examples, the output device(s) 718 may play a different sound or display a different graphic depending on whether a response 112 is a successful response 112a or an error 112b. The output device(s) 718 may also play various sounds and provide graphics associated with the web application 102. Output device(s) 718 can also include ports for one or more peripheral devices, such as headphones, peripheral speakers, or a peripheral display.

In various implementations, input device(s) 720 include any input devices known in the art. For example, the input device(s) 720 may include a camera, a microphone, or a keyboard/keypad. The input device(s) 720 can include the touch-sensitive display or a keyboard to enable users to enter data and make requests 110 and receive responses 112 via the web application 102 (e.g., in a web browser) and other applications 706. The touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like.

Figure 8:
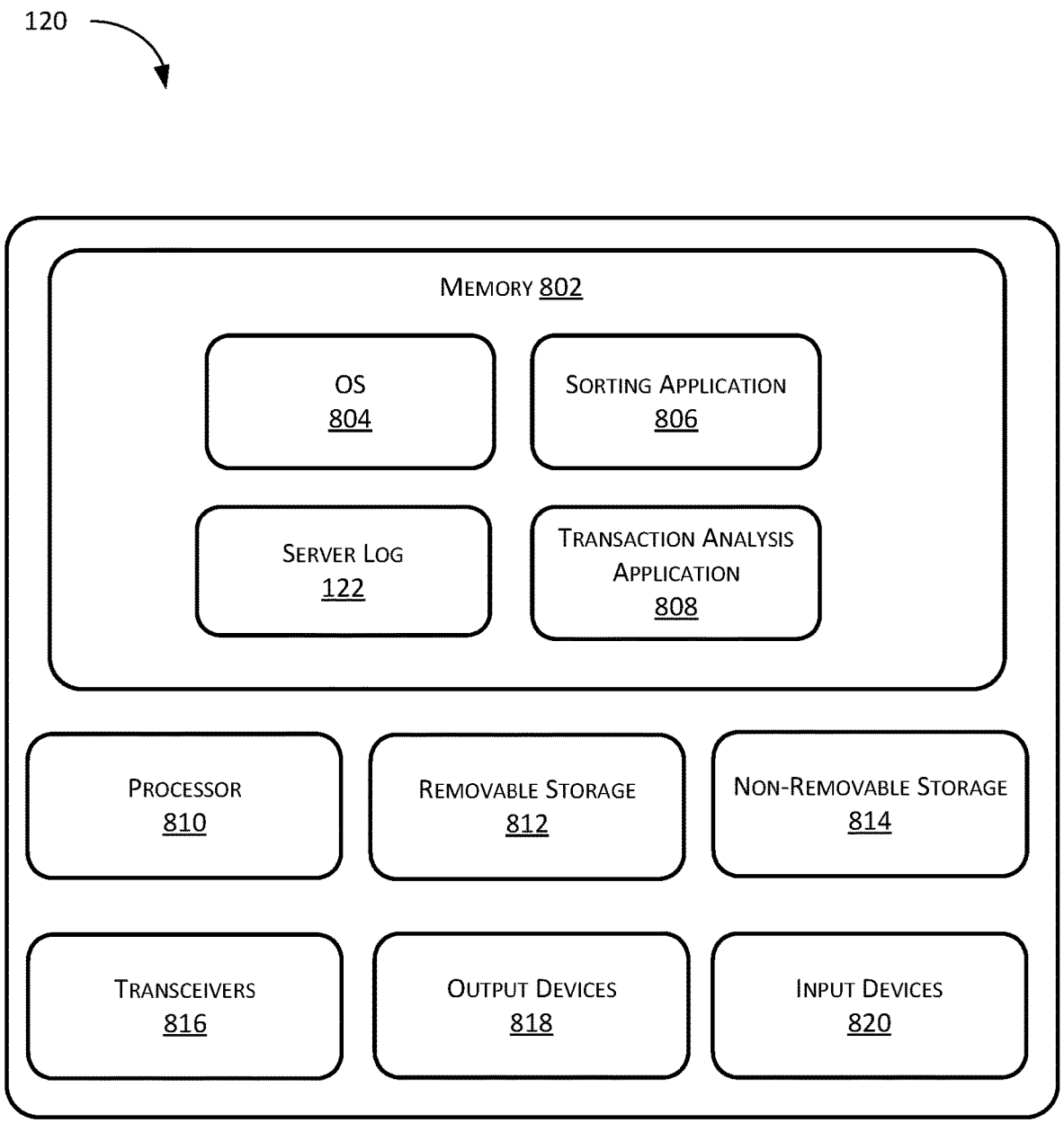
FIG. 8 is an example of a log server for use with the systems and methods disclosed herein, in accordance with some examples of the present disclosure.

As shown in FIG. 8, the systems 100, 300 and method 500 can also be used in conjunction with the log server 120. To simplify the discussion, the log server 120 is discussed below as a standalone server. One of skill in the art will recognize, however, that the systems 100, 300 and method 500 disclosed herein can also be implemented partially, or fully, on a network entity such as, for example, the HLR/HSS 620, for example, or a 3GPP AAA server, among other things. Thus, the discussion below in terms of the log server 120 is not intended to limit the disclosure to the use of a standalone server.

The log server 120 can be a TAS 632, for example, capable of receiving, storing, sorting, and analyzing signaling transactions 114, as discussed above. The log server 120 can comprise a number of components to execute part, or all, of the above-mentioned systems 100, 300 and method 500. The log server 120 can comprise memory 802 including, for example, the server log 122, an OS 804, a sorting application 806, and transaction analysis application 808. In various implementations, the memory 802 can be volatile (such as RAM), non-volatile (such as ROM, flash memory, etc.), or some combination of the two. The memory 802 can include all, or part, of the functions 122, 806, 808 and the OS 804 for the log server 120, among other things.

The OS 804 can vary depending on the manufacturer of the log server 120 and the type of component. Many servers, for example, run Linux or Windows server. Dedicated cellular routing servers may run specific telecommunications OSs. The OS 804 contains the modules and software that supports a computer's basic functions, such as scheduling tasks, executing applications, and controlling peripherals. The OS 804 can enable the log server 120 to receive, sort, and store the list 118 as well as generate reports and log files, among other things. In some examples, as discussed below, the OS 804 can also enable the log server 120 to perform some, or all, of the systems 100, 300 and method 500 discussed herein.

In some examples, the log server 120 can include the server log 122. The server log 122 can comprise a plurality of lists 118 that are periodically sent from a plurality of UEs 104 to the log server 120. The server log 122 can include data associated with a plurality of signaling transactions 114, which can be from one or more different web applications 102 and one or more UEs 104. In some examples, the server log 122 can be located directly on the log server 120—e.g., on a hard drive of the log server 120. In other applications, the server log 122 can be stored on a remote server, a bank of servers, or in the cloud. The server log 122 can comprise a character delimited list (e.g., pipe, comma, or slash delimited) of data points useful to the analysis of the web application(s) 102 such as, for example, error codes, success codes, IP addresses, web addresses, times, etc.

In some examples, the log server 120 can also comprise a sorting application 806. The sorting application 806 may perform the same, or similar, functions to those discussed above with respect to the sorting application 708 of the UE 104. Thus, the sorting application 806 may sort the signaling transactions 114 into requests 110 and responses 112. The sorting application 806 may also further sort the responses 112 into successful responses 112a (e.g., 200 OK) and errors 112b (e.g., 408—REQUEST TIMEOUT). In some examples, the sorting application 806 can further sort the errors 112b by error code (e.g., 400—BAD REQUEST, 401—UNAUTHORIZED, 402—PAYMENT REQUIRED, etc.). The sorting application 806 may also add this information to the list 118 as an additional data field to facilitate analysis.

The log server 120 can also comprise a transaction analysis application 808. As the name implies, the transaction analysis application 808 can use the data in the server log 122 to identify trends and issues. Thus, the transaction analysis application 808 may identify a particular web application 102, for example, with an excessive number or errors 112b. This, in turn, can enable developers to identify the web application 102 or the third-party application server 106 as the problem—as opposed to the UE 104, the network, or other possible causes. Thus, if a particular web application 102 or third-party application server 106 has a predetermined number of responses 112 that are errors 112b, the transaction analysis application 808 may generate a report with the portions of the list 118 associated with the web application 102, the error code(s), and the times for the errors 112b, among other things. By analyzing the lists 118, the transaction analysis application 808 can identify issues with the web application 102, the third-party application server 106, the web browser, the network connection, or other sources that would have been difficult to identify without the interceptor application 108.

The log server 120 can also comprise one or more processors 810. In some implementations, the processor(s) 810 can be a central processing unit (CPU), a graphics processing unit (GPU), both CPU and GPU, or any other processing unit. The log server 120 can also include one or more of removable storage 812, non-removable storage 814, transceiver(s) 816, output device(s) 818, and input device(s) 820.

The log server 120 may also include additional data storage devices (removable and/or non-removable) such as, for example, magnetic disks, optical disks, or tape. Such additional storage is illustrated in FIG. 8 by removable storage 812 and non-removable storage 814. The removable storage 812 and non-removable storage 814 can store some, or all, of the OS 804, the server log 122, and other functions 806, 808.

Non-transitory computer-readable media may include volatile and nonvolatile, removable and non-removable tangible, physical media implemented in technology for storage of information, such as computer-readable instructions, data structures, program modules, or other data. The memory 802, removable storage 812, and non-removable storage 814 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the log server 120. Any such non-transitory computer-readable media may be part of the log server 120 or may be a separate database, databank, remote server, or cloud-based server.

In some implementations, the transceiver(s) 816 include any transceivers known in the art. In some examples, the transceiver(s) 816 can include wireless modem(s) to facilitate wireless connectivity with the UE 104, the Internet, the cellular network, and/or an intranet via a cellular connection. Further, the transceiver(s) 816 may include a radio transceiver that performs the function of transmitting and receiving radio frequency communications via an antenna (e.g., Wi-Fi 614 or Bluetooth®) to connect to the IP network 616.

In other examples, the transceiver(s) 816 may include wired communication components, such as a wired modem or Ethernet port. The transceiver(s) 816 can enable the log server 120 to communicate with the UE 104 and to receive the list 118 from the accumulator application 116, among other things.

In some implementations, the output device(s) 818 include any output devices known in the art, such as a display (e.g., a liquid crystal or thin-film transistor (TFT) display), a touchscreen display, speakers, a vibrating mechanism, or a tactile feedback mechanism. In some examples, the output device(s) 818 can play various sounds based on, for example, when the transaction analysis application 808 generates a report, when the log server 120 is connected to a network, when a list 118 is received, etc. Output device(s) 818 can also include ports for one or more peripheral devices, such as headphones, peripheral speakers, or a peripheral display.

In various implementations, input device(s) 820 include any input devices known in the art. For example, the input device(s) 820 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

While several possible examples are disclosed above, examples of the present disclosure are not so limited. For instance, while the systems 100, 300 and method 500 above are discussed with reference to use with web applications 102, the systems 100, 300 and method 500 can be used with other types of applications where a portion of the processing and/or storage used by the applications is handled by multiple components on a network. In addition, while various functions are discussed as being performed on the UE 104 and/or on the log server 120, for example, other components, such as network entities, could perform some, or all, of these functions without departing from the spirit of the invention. And, while the disclosure is primarily directed to UEs 104 using web applications 102, it can also be used with other types of communications and on other devices (e.g., other IP network, machine-to-machine (M2M), or internet of things (IoT) devices) on the same, or similar, networks or future networks. Indeed, the systems 100, 300 and method 500 described herein can be applied to virtually any type of application where at least a part of the functions for the application are carried out on multiple components or in multiple locations.

Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A user equipment (UE) comprising:
    one or more inputs;
    a transceiver to send and receive at least one of wired or wireless transmissions;
    memory storing computer-executable instructions including at least a web browser and an interceptor application; and
    a processor in communication with at least the transceiver and the memory, the computer-executable instructions causing the processor to perform acts comprising:
        receiving, from the one or more inputs, a request to access a web application via the web browser;
        sending, from the transceiver to the interceptor application, the request;
        sending, from the interceptor application to an accumulator application, the request;
        storing, in a list in the memory with the accumulator application, the request; and
        sending, from the interceptor application to the transceiver, a first signal to cause the transceiver to send the request to a third-party application server associated with the web application.

2. The UE of claim 1, the computer-executable instructions further causing the processor to perform acts comprising:
    receiving, at the transceiver, a response to the request from the third-party application server;
    sending, from the transceiver to the interceptor application, the response;
    sending, from the interceptor application to the accumulator application, the response;
    storing, in the list in the memory with the accumulator application, the response; and
    sending, from the interceptor application to the web application, the response.

3. The UE of claim 2, the computer-executable instructions further causing the processor to perform acts comprising:
    determining whether the response is a successful response or an error; and either:
        tagging the response as a successful response in the list if the response is determined to be a successful response; or
        tagging the response as an error in the list if the response is determined to be an error.

4. The UE of claim 2, the computer-executable instructions further causing the processor to perform acts comprising:
    determining, with the accumulator application, that a predetermined number of requests and responses have been stored to the list to asynchronously log the list package at a log server;
    sending, from the accumulator application to the transceiver, a list package including data associated with the predetermined number of requests and responses; and
    sending, from the accumulator application to the transceiver, a second signal to cause the transceiver to send the list package to the log server.

5. The UE of claim 4, wherein the data comprises a plurality of pipe delimited data fields stored in a JavaScript Object Notation (JSON) file.

6. The UE of claim 1, the computer-executable instructions further causing the processor to perform acts comprising:
    receiving, at the transceiver, a WebSocket notification;
    sending, from the transceiver to the interceptor application, the WebSocket notification;
    sending, from the interceptor application to the accumulator application, the WebSocket notification;
    storing, in the list with the accumulator application, the WebSocket notification; and
    sending, from the interceptor application to the web application, the WebSocket notification.

7. A method comprising:
    receiving, at an interceptor application on a user equipment (UE), a signaling transaction associated with a web application;

sending, from the interceptor application to an accumulator application, the signaling transaction;
storing, in a list in a memory of the UE, the signaling transaction with the accumulator application;
determining, with the interceptor application, that the signaling transaction is a request from the web application to a third-party application server associated with the web application; and
sending, from the interceptor application to a transceiver of the UE, a first signal to cause the transceiver to send the request to the third-party application server.

8. The method of claim 7, further comprising:
determining, with the interceptor application, that the signaling transaction further includes a response from the third-party application server associated with the web application; and
sending, from the interceptor application to the web application, the response.

9. The method of claim 8, further comprising:
determining, with the accumulator application, that the response is an error; and
wherein storing the signaling transaction in the list further comprises tagging the response as an error.

10. The method of claim 9, wherein storing the signaling transaction in the list further comprises including an error response code associated with the response.

11. The method of claim 8, further comprising:
determining, with the accumulator application, that the response is a successful response; and
wherein storing the signaling transaction in the list further comprises tagging the response as a successful response.

12. The method of claim 7, further comprising:
determining, with the accumulator application, that the list contains a predetermined number of signaling transactions;
packaging, with the accumulator application, the list into a list package; and
sending, from the accumulator application to the transceiver of the UE, a second signal to cause the transceiver to send the list package to a log server.

13. The method of claim 7, wherein the list comprises a plurality of character delimited data fields stored in a JavaScript Object Notation (JSON) file.

14. A log server comprising:
a transceiver to send and receive at least one of wired or wireless transmissions;
memory storing computer-executable instructions including at least a server log and a sorting application; and
a processor in communication with at least the transceiver and the memory, the computer-executable instructions causing the processor to perform acts comprising:

receiving, at the transceiver from an accumulator application running on a user equipment (UE), a list package comprising a list of signaling transactions between the UE and a third-party application server associated with a web application;
sorting, with the sorting application, the plurality of signaling applications into a plurality of requests and a plurality of responses;
sorting, with the sorting application, the plurality of responses into a plurality of successful responses and a plurality of errors;
updating, with the sorting application, the list to include a tag labeling each signaling transaction as a request, a successful response, or an error; and
storing, in the server log, an updated list.

15. The log server of claim 14, the memory further comprising a transaction analysis application, the computer-executable instructions further causing the processor to perform acts comprising:
determining, with the transaction analysis application, that a predetermined number of the plurality of errors include one or more related error codes;
determining, with the transaction analysis application, a common source of the plurality of errors based at least in part on the one or more related error codes; and
generating a report including at least the common source and the predetermined number.

16. The log server of claim 15, wherein the one or more related error codes comprise 4XX error codes; and
wherein the common source is determined to be one of the UE or the web application.

17. The log server of claim 15, wherein the one or more related error codes comprise 5XX error codes; and
wherein the common source is determined to be the third-party application server.

18. The log server of claim 14, the computer-executable instructions further causing the processor to perform acts comprising:
sorting, with the sorting application, the plurality of errors by a response code included in the signaling transaction; and
updating, with the sorting application, the updated list to include a tag labeling each of the plurality of errors with a tag associated with the response code.

19. The log server of claim 14, wherein the list comprises a plurality of character delimited data fields; and
wherein the character comprises one of a pipe, a comma, or a slash.

* * * * *